United States Patent [19]

Koiwa et al.

[11] Patent Number: 4,969,140
[45] Date of Patent: Nov. 6, 1990

[54] ROTARY DISC LOADING MECHANISM

[76] Inventors: Takemi Koiwa, 1-11-18, Aioi, Sagamihara-shi, Kanagawa; Hiroshi Niida, 1319-33, Mutsuzaki, Sakura-shi, Chiba, both of Japan

[21] Appl. No.: 347,616

[22] Filed: May 5, 1989

[30] Foreign Application Priority Data

May 16, 1988 [JP] Japan .................................. 63-64915

[51] Int. Cl.⁵ ............................................. G11B 25/04
[52] U.S. Cl. .................................. 369/77.1; 369/75.2
[58] Field of Search ........................... 369/75.1–75.2, 369/77.1, 79, 194, 176, 270, 249, 282, 244, 253

[56] References Cited

U.S. PATENT DOCUMENTS

| | | | |
|---|---|---|---|
| 4,498,162 | 2/1985 | Schatteman | 369/77.1 |
| 4,509,157 | 4/1985 | Morinaga | 369/75.2 |
| 4,523,306 | 6/1985 | Staar | 369/77.1 |
| 4,641,298 | 2/1987 | Ikedo et al. | 369/77.1 |
| 4,674,079 | 6/1987 | Agostini | 369/77.1 |
| 4,677,607 | 6/1987 | Ejini | 369/77.1 |
| 4,697,259 | 9/1987 | Takanashi | 369/75.2 |
| 4,701,901 | 10/1987 | Imai | 369/77.1 |
| 4,733,387 | 3/1988 | Yoshimura | 369/77.1 |
| 4,839,880 | 6/1989 | D'Alayer de Costenore D'Arc et al. | 369/75.2 |
| 4,882,722 | 11/1989 | Mutsuura et al. | 369/75.2 |

Primary Examiner—William M. Shoop, Jr.
Assistant Examiner—David Martin
Attorney, Agent, or Firm—Pollock, Vande Sande and Priddy

[57] ABSTRACT

A mechanism for loading compact discs or similar rotary discs, in which two guide arms are rotatably mounted on a base plate symmetrically with respect to its center line and a disc detect arm is rotatably mounted on each guide arm. Each guide arm has a large-diametered disc holding portion for holding a large-diametered disc and a small-diametered disc holding portion for holding a small-diametered disc. Each guide arm is being applied a moment which reverses its direction when the guide arm passes a predetermined rotational angular position of the guide arm. The disc detect arm is being applied a moment in a direction in which a projection provided at its one end enters into the large-diametered disc holding portion and the other end of the disc detect arm slides in an L-shaped guide slot made in the base plate, thereby limiting the rotational movement of the disc detect arm and the rotational movement of the guide arm. In consequence, each guide arm is normally held in its locked state at a rotational angular position for receiving the small-diametered disc. When the large-diametered disc is loaded, it collides with the projections of the disc detect arms to turn them, by which the guide arms are each unlocked and permitted to turn to a rotational angular position for receiving the large-diametered disc.

12 Claims, 11 Drawing Sheets

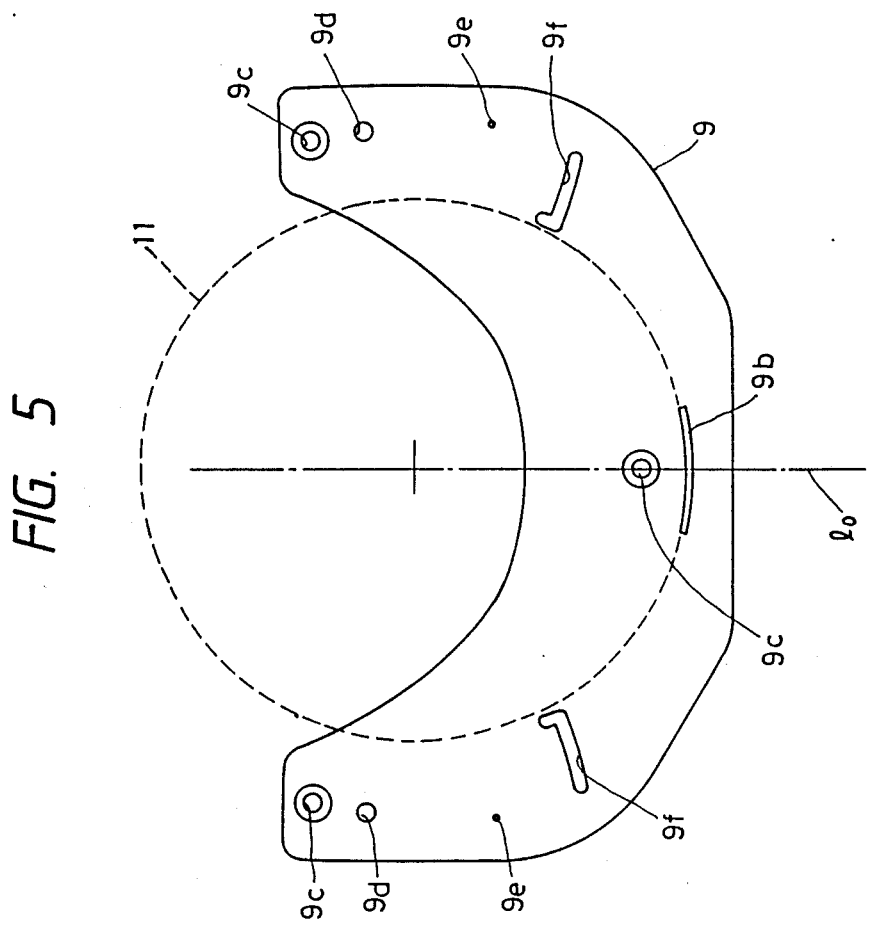

FIG. 7A  FIG. 7B
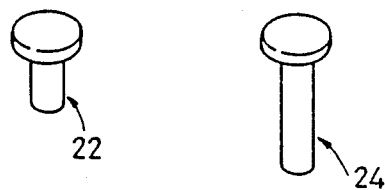
FIG. 8
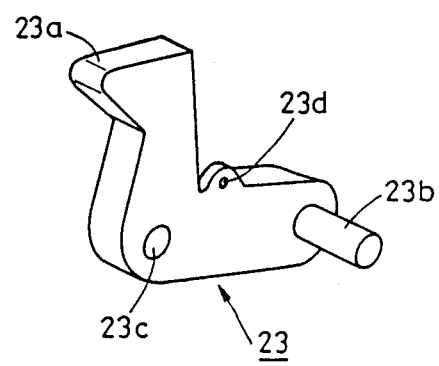
FIG. 9A  FIG. 9B
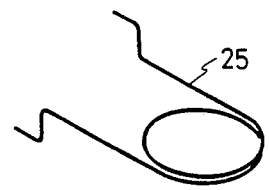 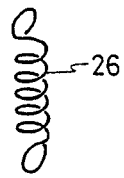

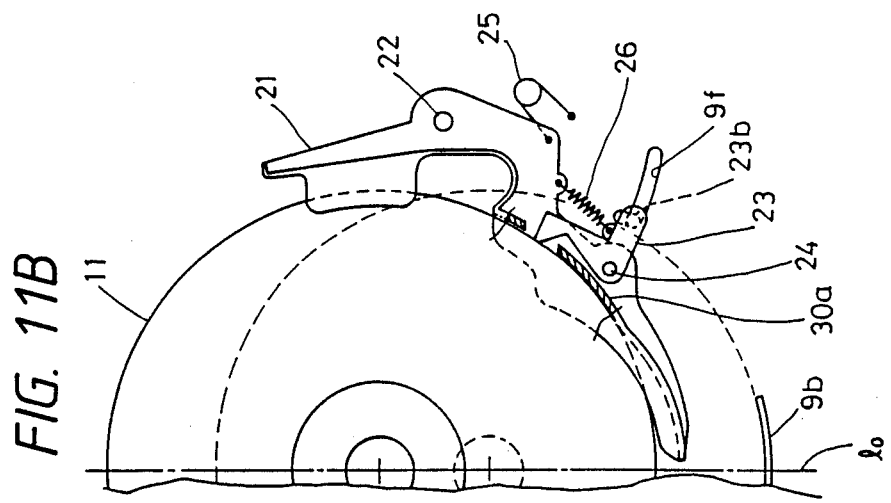
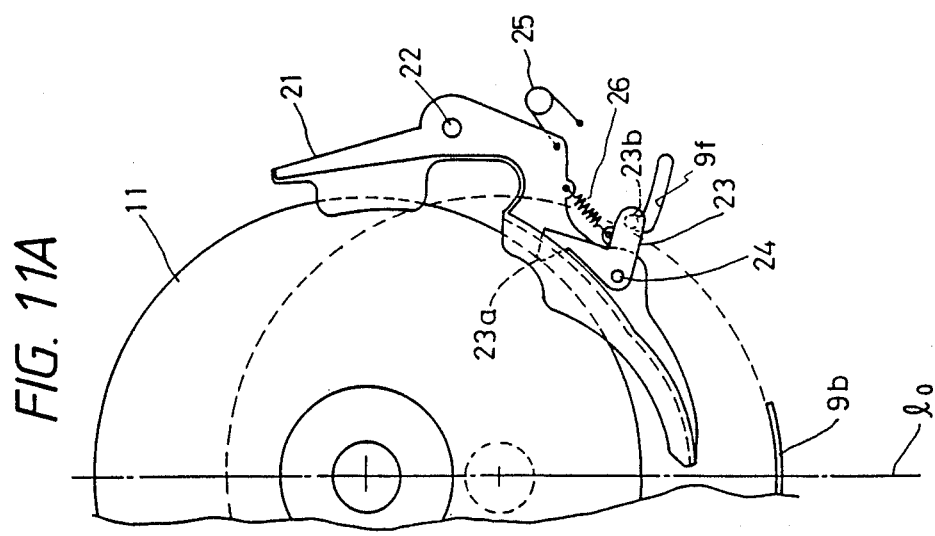

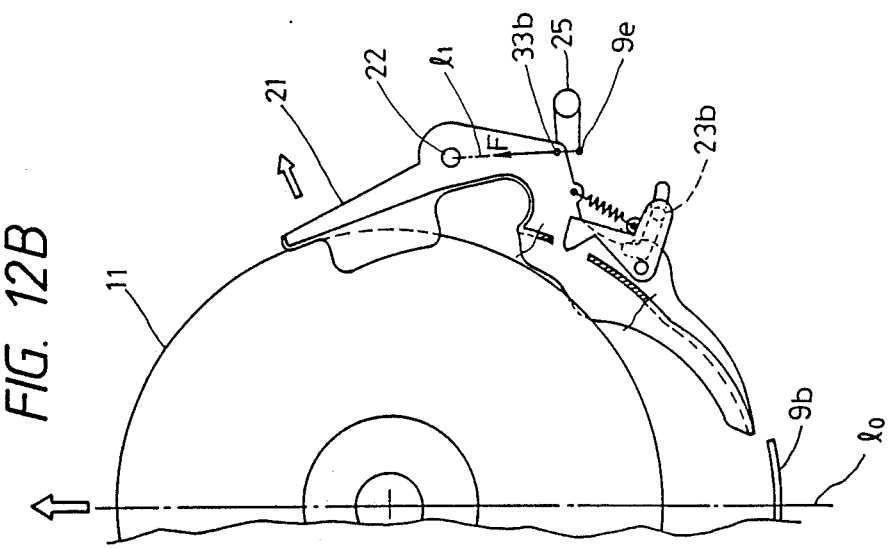
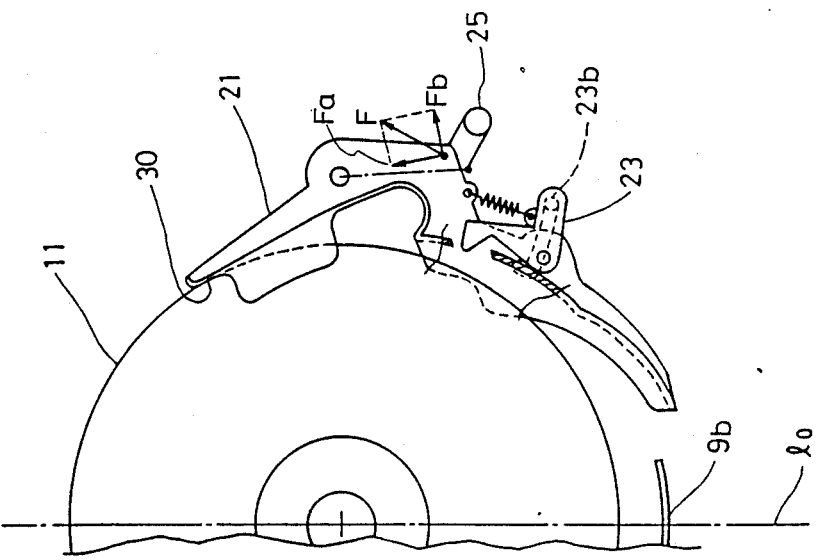

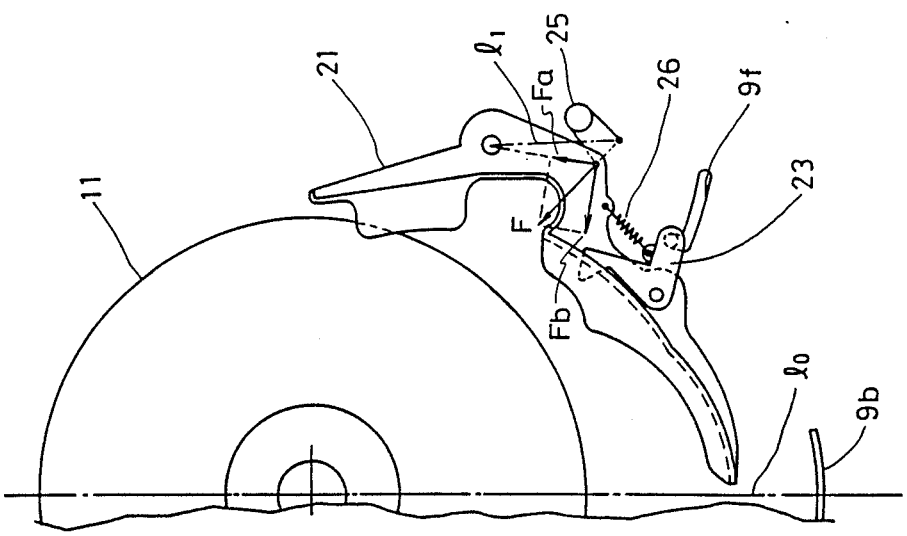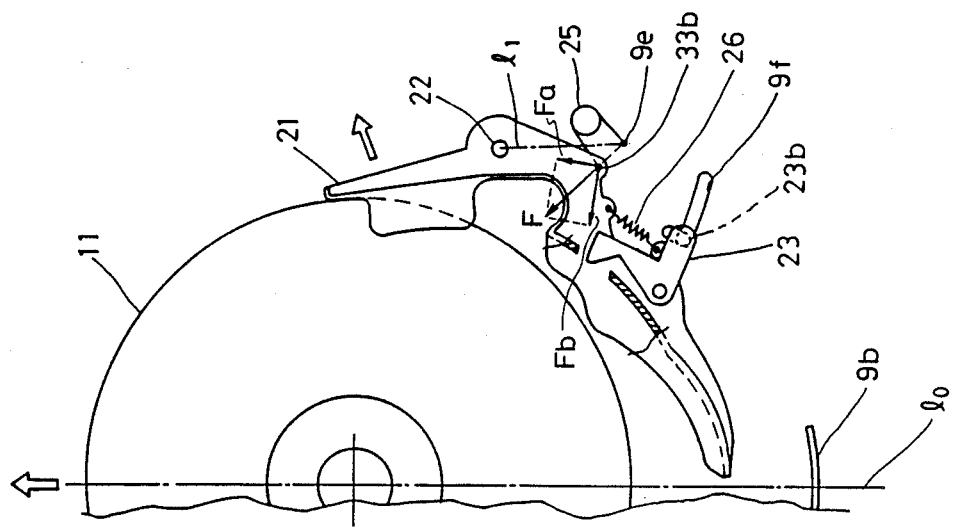

ROTARY DISC LOADING MECHANISM

BACKGROUND OF THE INVENTION

The present invention relates to a novel rotary disc loading mechanism by which compact discs (hereinafter referred to as CDs), video discs, records, or similar rotary discs of different outer diameters can each be loaded substantially vertically with its center set at a predetermined position.

The spread and growth of CDs in recent years are amazing and their sales volume has already exceeded that of LP records. Besides standard 12 cm diameter CDs (playing for 60 minutes each side), 8 cm diameter single CDs (playing for about 20 minutes each side) have recently been placed on the market.

FIG. 1 shows in section the principal part of a conventional CD loading mechanism adapted to load a CD for driving in an upright position. A lid 2 is pivotally secured to a disc housing of a CD player. In this example the lid 2 has its lower portion bent inwardly just about 90 degrees and extended to form a bottom 2a, the end portion of which has at either side a through hole 2b extending therethrough in parallel to the major surface of the lid 2. The lid 2 is hingedly fixed to a case 1 or the like of the CD player by means of bolts (not shown) inserted into the through holes 2b. The lid 2 has a circular cavity 2c centrally thereof, the bottom of which has a centrally-disposed circular hole 2d made therein coaxially with the cavity 2c and a circumferential marginal portion 2e surrounding the hole 2d.

A hollow cylindrical magnet 3 is disposed in the circular hole 2d. A CD holding disc 4 and a presser disc 5 are mounted on the inside and outside of the magnet 3, respectively, and they are coaxially assembled together by means of a screw 6. The CD holding disc 4 has an outer diameter a little larger than that of the circumferential marginal portion 2e. The central portion of the disc 4 is truncated-cone-shaped and juts out into the hollow cylindrical magnet 3. The outer diameter of the presser disc 5 is smaller than the inner diameter of the circular cavity 2c but larger than the diameter of the circular hole 2d. The magnet 3 and the discs 4 and 5 attached to the both sides thereof constitute a bobbin-shaped CD holding unit 7, which has an engaging recess 8 corresponding to a winding space, for engagement with the circumferential marginal portion 2e.

A square base plate 9, which has a circular hole 9a centrally thereof, is screwed onto the inside of the lid 2 with spacers held therebetween. The circular hole 9a has an inner diameter a little larger than the outer diameter of the circumferential marginal portion 2e and is held coaxially therewith. The base plate 9 has, centrally of its lower marginal edge, an inwardly projecting arc-shaped disc support 9b formed integrally therewith and coaxially with the circular hole 9a. The distance between the center of the circular hole 9a and the inner peripheral surface of the disc support 9b is equal to the 6 cm radius of the standard CD.

With this conventional CD loading mechanism, the standard type 12 cm diameter CD indicated by 11 is loaded in the following manner. After opening the lid 2 outwardly, the CD 11 needs only to be inserted into the opening so that it slides down along the inner surface of the CD holding disc 4. The CD 11 is automatically guided onto the disc support 9b and set at a pre-determined position.

Then, upon closing the lid 2, the disc holding unit 7 partly pops out toward a turntable 12 by virtue of the magnetic force acting between the magnet 3 and the turntable 12; so that a circular recess 4a of the CD holding disc 4 receives a trapezoidal portion 12a of the turntable 12 through a center hole 11a of the CD 11. At the same time, the CD 11 thus put on the turntable 12 rises just about 1.5 mm along its trapezoidal portion 12a, and consequently, the lower marginal edge of the CD 11 slightly moves up from the disc support 9b. In this way, the CD 11 is gripped between the CD holding disc 4 and the turntable 12.

On the other hand, an 8 cm diameter small sized CD must be set on a 12 cm diameter adapter 12 such as shown in FIGS. 2A and 2B, for loading into the above-mentioned CD loading mechanism. As shown in FIGS. 2A and 2B, the adapter 12 is an about 2 mm thick doughnut-shaped disc which is made of synthetic resin and has an 8 cm diameter hole 14a centrally thereof. The adapter 14 has notches 14b cut therein at equiangular intervals with respect to the center of the hole 14a and extending therefrom in its circumferential direction so that CD gripping portions 14c are defined between the notches 14b and the hole 14a. On the inner peripheral surface of the central hole 14a adjacent each CD gripping portion 14c there are protrusively provided a pair of parallel, opposed lugs 14d and 14e, which define therebetween a groove 14f for receiving the marginal edge of the CD. The lug 14d is less protrusive than the lug 14e.

The small-sized CD is set on the adapter 14 in the following manner. The first step is to press the marginal portion of the CD into the grooves of two of the three gripping portions 14c from the side of the lugs 14d, followed by urging the CD toward the inner peripheral surface of the hole 14a intermediate between the two gripping portions 14c, by which the base portions of the two gripping portions 14c are elastically deformed and, at the same time, the notches 14b are narrowed. Then, by removing the force to the CD while holding the marginal portion of the CD opposite the remaining groove 14f of the remaining gripping portion 14c, the first two gripping portions 14c are restored to their initial state, pressing the marginal edge of the CD into the groove 14f of the remaining gripping portion 14c. Thus the small-sized CD is elastically gripped at its marginal edge by the three gripping portions 14c of the adapter 14.

As described above, according to the conventional CD loading mechanism, the small-sized CD cannot be set directly thereon and must be present on an adapter for loading in a CD player, which is very troublesome. Furthermore, the adapter utilizes the elasticity of its material (synthetic resin) for mounting, dismounting and holding of the small-sized CD, but a play is liable to occur between the adapter and the small-sized CD due to a decrease in the elasticity of the material by aging, a warp of the adapter surface and wear of the grooves 14f of the gripping portions, and consequently, the adapter is short-lived.

SUMMARY OF THE INVENTION

It is therefore an object of the present invention to provide a CD loading mechanism which permits easy setting thereon of both large- and small-sized CDs without the necessity of using an adapter.

The rotary disc loading mechanism of the present invention includes:

a lid of synthetic resin which is pivotally secured to a disc housing and assumes a substantially vertical position when closed;

a disc holding portion which urges a rotary disc against and holds its on a turntable;

a base plate which is mounted on the inside of the lid and has a pair of L-shaped guide grooves symmetrical with respect to a center line of the base plate and an arc-shaped disc support perpendicularly intersecting the center line and having substantially the same curvature as that of a large-sized rotary disc;

a pair of guide arms of synthetic resin which are rotatably mounted on guide arm shafts planted on the base plate, disposed symmetrically with respect to the center line, and each have a small-sized disc guide groove and a large-sized disc guide groove;

a pair of disc detect arms of synthetic resin each of which is rotatably mounted on one of the guide arms and has a projection retractable from a window of the large-sized disc guide groove and a guide boss for engagement with a guide slot made in the base plate and each of which unlocks the guide arm by the retraction of the projection from the window of the large-sized disc guide groove upon insertion thereinto of the large-sized rotary disc;

a pair of toggle springs each of which is engaged at one end with an engaging hole of the base plate and at the other end with a first engaging hole of one of the guide arms, for applying a moment to the corresponding guide arm about the guide arm shaft in a direction in which the small- and large-sized disc guide grooves approach or leave from the center line, depending on whether the first engaging hole lies closer to the center line than to a dead line joining the guide arm shaft and the engaging hole of the base plate; and a pair of coiled springs each of which is engaged at one end with a second engaging hole of one of the guide arms and at the other end with an engaging hole of one of the disc detect arms, for turning the corresponding disc detect arm so that its projection projects out of the window of the large-sized disc guide groove and the corresponding guide boss moves to its locked position in the guide groove of the base plate.

BRIEF DESCRIPTION OF THE DRAWINGS

FIG. 5 is a front view of a base plate 9 in FIG. 3;

FIGS. 7A and 7B are perspective views of a guide arm shaft 22 and a detect arm shaft 24 in FIG. 3, respectively;

FIG. 8 is a perspective view of a left-hand disc detect arm 23 in FIG. 3;

FIGS. 9A and 9B are perspective views of a toggle spring 25 and a coiled spring 26 in FIG. 3, respectively;

FIGS. 11A through 11D are front view for explaining the loading a large-sized disc in the embodiment of FIG. 3; and FIGS. 12A through 12D are front views for explaining a sequence of steps involved in unloading the large-sized disc from the rotary disc loading mechanism of FIG. 3.

DESCRIPTION OF THE PREFERRED EMBODIMENTS

Figure 1:
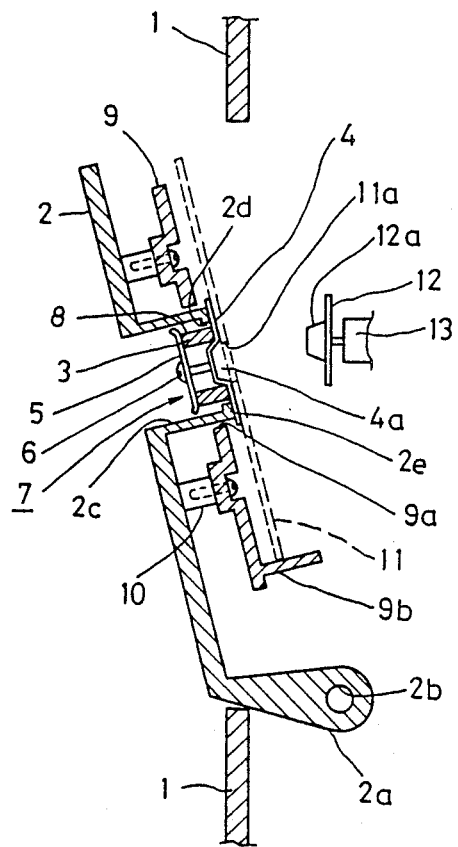
FIG. 1 is a sectional view of a conventional CD loading mechanism.
Figure 2:
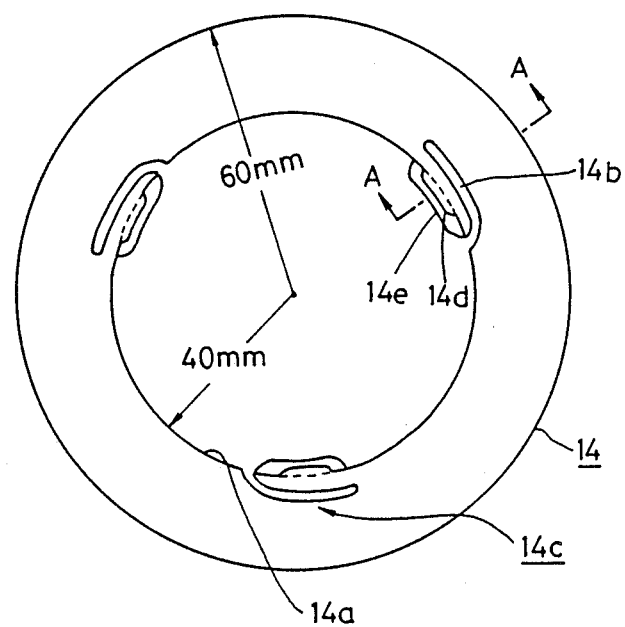
FIG. 2A is a front view of a conventional adapter for use with 8 cm diameter CDs.
FIG. 2B is a sectional view taken on the line A—A in FIG. 2A.
Figure 2B:
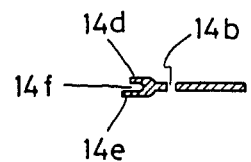
Figure 3:
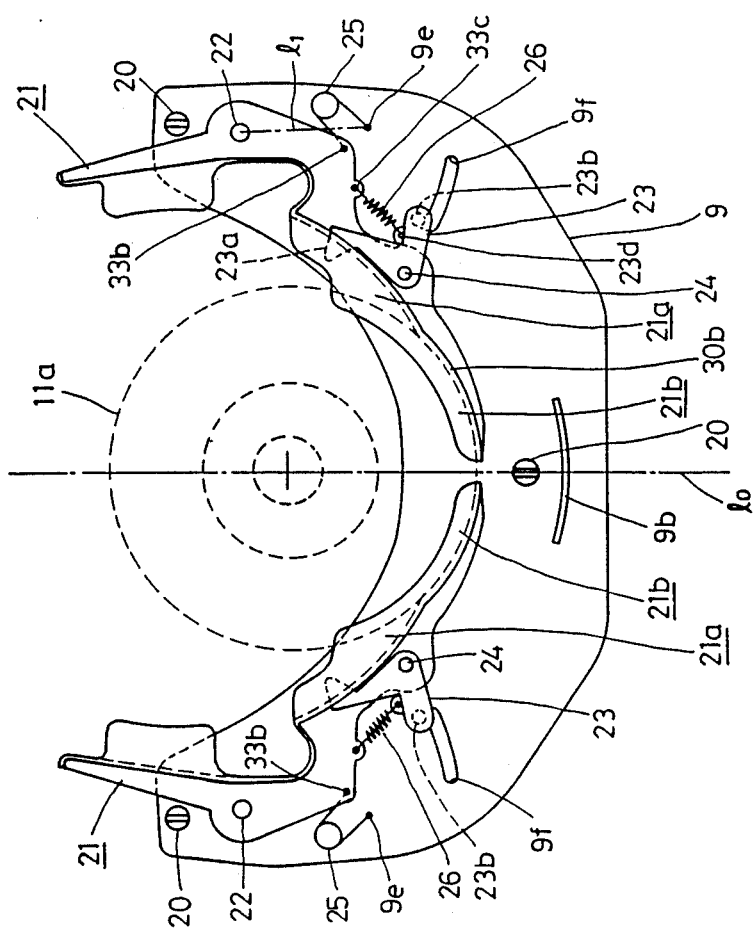
FIG. 3 is a front view of an embodiment of the rotary disc loading mechanism of the present invention.
Figure 4:
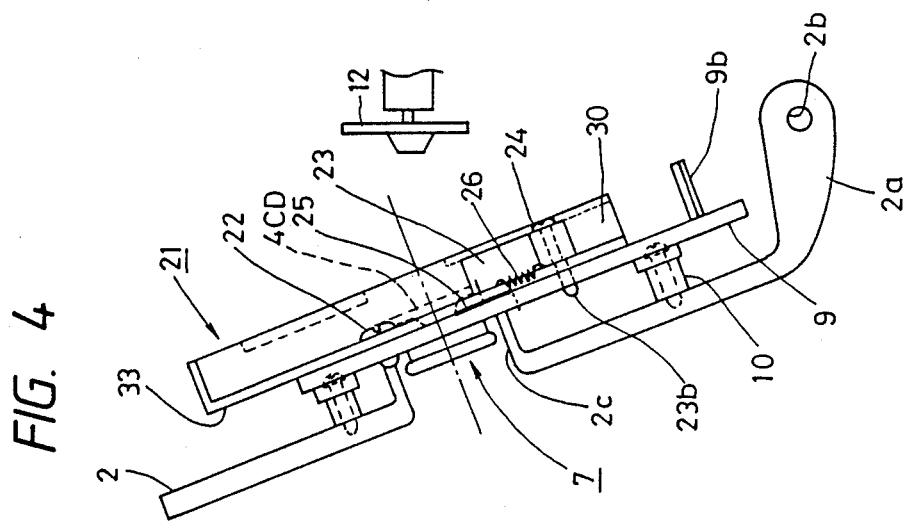
FIG. 4 is a side view of the FIG. 3 embodiment, with its lid opened.

An embodiment of the rotary disc loading mechanism according to the present invention is shown in FIGS. 3 and 4 in which the parts corresponding to those in FIG. 1 are identified by the same reference numerals. The lid 2, the disc holding unit 7 and the turntable 12 are identical with those used in the prior art example. FIG. 3 is a front elevation of the rotary disc loading mechanism as viewed from the turntable side, and the mechanism is symmetric with respect to a center line $l_0$. The base plate 9 is attached by three screws 20 to the lid (not shown) as in the prior art example. On the base plate 9 a pair of guide arms 21 are rotatably mounted on guide arm shafts 22 and each guide arm 21 carries a disc detect arm 23 rotatably mounted on a detect arm shaft 24. In FIG. 3 there is also shown in broken line a small-sized CD 11a which is to be set at a predetermined position in the CD loading mechanism.

The base plate 9 is formed by a sheet of synthetic resin which is symmetric with respect to the center line $l_0$ and is, in general, horseshoe-shaped as depicted in FIG. 5. On the base plate 9 there is molded integrally therewith at the center of its lower portion the arc-shaped disc support 9b which extends across the center line $l_0$ and stands upright from the base plate surface. On the center line $l_0$ just above the disc support 9b there is made in the base plate 9 a screw hole 9c for screwing it to the lid. In both end portions of the base plate 9 there are made, symmetrically with respect to the center line $l_0$, screw holes 9c for screwing therethrough the base plate 9 to the lid, holes 9d for receiving the guide arm shafts 22, engaging holes 9e for engagement with toggle springs described later, and disc detect arm guide slots 9f for guiding guide bosses of the disc detect arms 23. Each guide slot 9f is a substantially L-shaped one which is composed of a slot along an arc of a circle with its center at the guide arm shaft 22 (pressed into the hole 9d) of the guide arm 21 and a slot extending substantially perpendicularly toward the guide arm shaft 22 from that one end of the arc-shaped slot which is closesr to the center line $l_0$. The inner peripheral surface of the disc support 9c is at the radius position of the large-sized CD and has the same curvature as that of its outer periphery as in the prior art.

Figure 6:
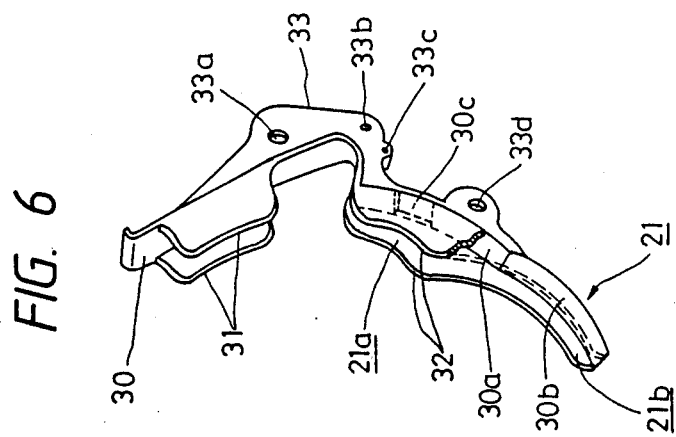
FIG. 6 is a perspective view of a right-hand guide arm in FIG. 3.

Each guide arm 21 is made of synthetic resin and, as shown in FIG. 6, has a band-shaped bottom panel 30 which receives the outer peripheral surface of the CD. The bottom panel 30 is gently curved in the middle thereof and extends outwardly at about 90 degrees, forming an arc-shaped large-sized disc support potion 30a (of the same curvature as that of the outer periphery of the 12 cm diameter CD) and an arc-shaped small-sized disc support portion 30b (of the same curvature as that of the outer periphery of the 8 cm diameter CD) contiguous thereto. Both side marginal portions of the bottom panel 30 are bent upright to form a pair of opposed side panels 31 and another pair of opposed side panels 32.

The side panels 31 and 32, the large-sized disc support portion 30a and the small-sized disc support portion 30b define large-sized and small-sized disc guide grooves 21a and 21b both U-shaped in cross section. The large-sized disc support portion 30a has a square window 30c. The marginal edge of the bottom panel 30 at the side where it makes direct contact with the base plate 9 extends at right angles to the bottom panel 30 in the direction opposite from the side panels 31 and 32, forming a side panel 33. the side panel 33 is flush with those of the side panels 31 and 32 which are to make direct contact with the base plate 9.

The side panel 33 has a through hole 33a for passing therethrough the guide arm shaft 22 (FIG. 7A), a first engaging hole 33b for engagement with one end of a toggle spring 25, a second engaging hole 33c for engagement with one end of a coiled spring 26, and a hole 33d into which the detect arm shaft 24 is pressed. By press-fitting the guide arm shaft 22 (FIG. 7A) into the hole 9d of the base plate 9 through the through hole 33a, the guide arm 21 is secured to the base plate 9 in a manner to be rotatable about the guide arm shaft 22.

As shown in FIG. 8, the disc detect arm 23 is a substantially L-shaped member of synthetic resin, which has a projection 23a at one end thereof and a guide boss 23b projecting from one side wall of the other end. Furthermore, the disc detect arm 23 has a through hole 23c for passing therethrough the detect arm shaft 24 in the vicinity of the outer corner of its central portion and a thin engaging hole 23d for engagement with the other end of the coiled spring 26 in a sectorial portion protrusively provided near the inner corner. The detect arm shaft 24 depicted in FIG. 7B is press-fitted into the hole 33d of the guide arm 21 through the through hole 23c and the guide boss 23b of the disc detect arm 23 is engaged with the guide slot 9f of the base plate 9. Thus the detect arm 23 is mounted on the guide arm 21.

The toggle spring 25 shown in FIG. 9A is engaged at one end with the engaging hole 9e of the base plate 9 and at the other end with the first engaging hole 33b of the guide arm 21. The coiled spring 26 depicted in FIG. 9B is engaged at one end with the second engaging hole 33c of the guide arm 21 and at the other end with the engaging hole 23d of the disc detect arm 23.

Figure 10:
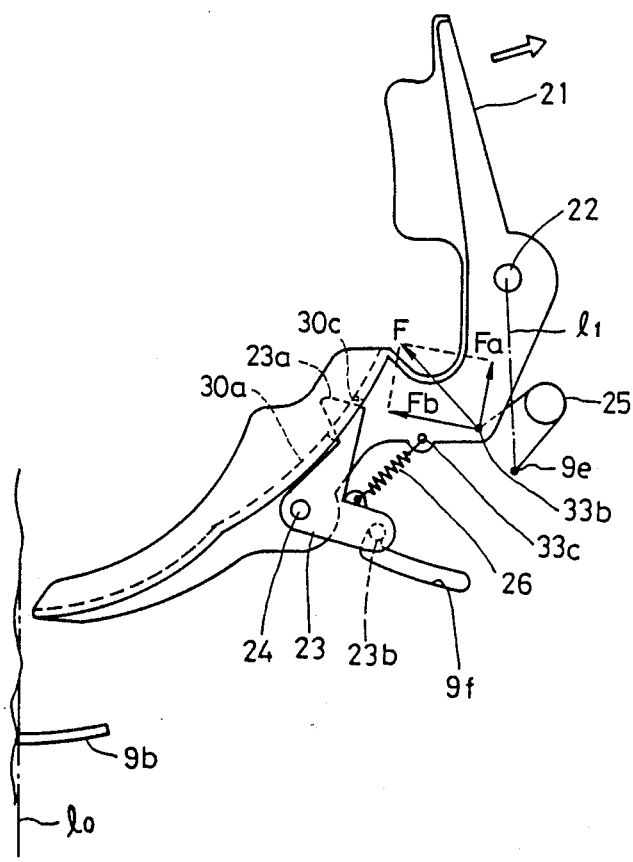
FIG. 10 is a diagram for explaining a moment which is applied by the toggle spring 25 to the guide arm 21 in FIG. 3.

In FIG. 3, when the top end portion of the guide arm 21 is pulled outwardly so that the first engaging hole 33b of the guide arm 21 is brought to a position a little inside a dead line $l_1$ (a line joining the guide arm shaft 22 and the engaging hole 9e of the base plate 9), that is, closer to the center line $l_0$ than the dead line l, the guide arm 21 will thereafter automatically turn in a direction indicated by the arrow in FIG. 10, and at the same time, the guide boss 23b will move in the guide slot 9f. When the guide boss 23b has reached a position closest to the center line $l_0$, the guide arm 21 stops. After this, the disc detect arm 23 automatically turns about the detect arm shaft 24 and the guide boss 23b moves up substantially at right angles toward the guide arm shaft 22 and abuts against one end of the guide slot 9f, stopping the disc detect arm 23 from turning as shown in FIG. 10.

Next, a description will be given of the reason for which the guide arm 21 and the disc detect arm 23 move as mentioned above. The toggle spring 25 applies a force F through the inner peripheral surface of the first engaging hole 33b to the guide arm 21 in a direction from the engaging hole 9e of the base plate 9 toward the first engaging hole 33b. As will be evident from the decomposition of the force F into a force Fa from the first engaging hole 33b toward the guide arm shaft 22 and a force Fb perpendicular to the force Fa, a moment is applied to the guide arm 21 about the guide arm shaft 22, clockwise in FIG. 10. In consequence, the guide arm 21 turns and the guide boss 23b moves in the guide slot 9f to the position closest to the center line $l_0$. Then, since the disc detect arm 23 is being pulled by the coiled spring 26, it turns counterclockwise about the detect arm shaft 24 in FIG. 10. As a result of this, the guide boss 23 moves up in the guide slot 9f from its inner end (closer to the center line $l_0$) toward the guide arm shaft 22 until it abuts against the extreme end of the guide slot 9f and locks there, preventing further rotational movement of the disc detect arm 23. In this instance, as the disc detect arm 23 turns, the tip of its projection 23a enters into the window 30c made in the large-sized disc support portion 30a. In this state the guide arm 21 is locked, and hence cannot turn in either direction.

(a) In the case of loading the 8 cm diameter CD:

After opening the lid 2 of the CD housing, the CD 11a needs only to be inserted into the upper opening aslant along the CD holding disc 4 until it goes down to the small-sized disc guide grooves 21b of the guide arms 21. Thus the CD 11a is set at a predetermined position with its outer peripheral surface partly resting on the small-sized disc support portions 30b (FIG. 3). In this instance, the CD 11a stays apart from the projections 23a of the disc detect arms 23 and the guide arms 21 are held at their locked position. In this state the CD 11a can freely be unloaded.

(b) In the case of loading the 12 cm diameter CD:

Guiding the CD 11 along the CD holding disc 4 down to the guide groove of the guide arm 21, the outer periphery of the CD 11 abuts first against the tip of the projection 23a of the disc detect arm 23 (FIG. 11A).

By further pressing down the CD 11 against the force of the coiled spring 26 until its lower peripheral portion abuts against the large-sized disc support portion 30a, the tip of the projection 23a projecting into the guide arm 21 through its window 30c is pushed back and out therefrom. At the same time, the disc detect arm 23 turns clockwise about the detect arm shaft 24 in FIG. 11B and the guide boss 23b moves down in the guide flow 9f to its inner arc-shaped end closer to the center line $l_0$, unlocking the guide arm 21.

Figure 11D:
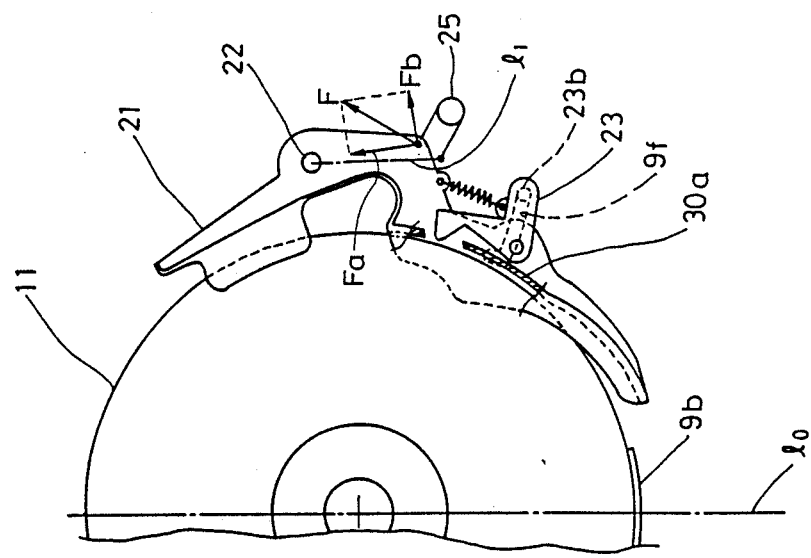
Figure 11C:
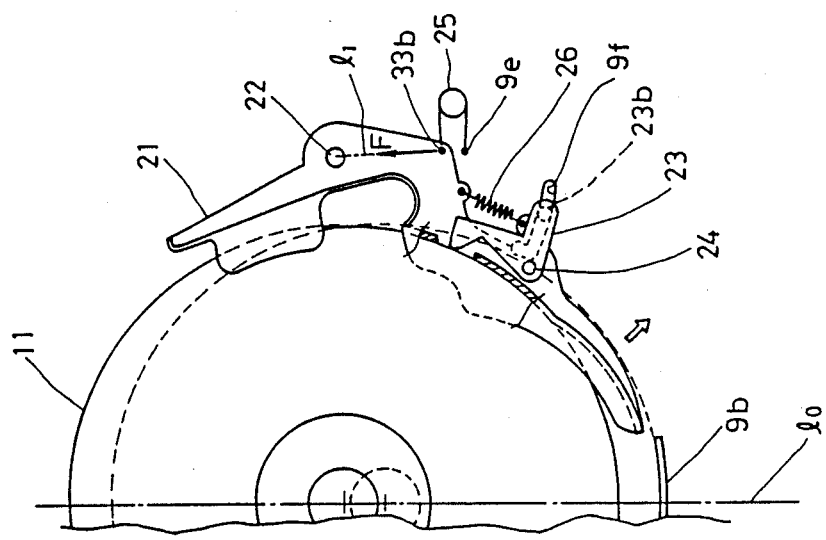

Further pressing down the CD 11, the guide arm 21 turns counterclockwise about the guide arm shaft 22 and the guide boss 23b in the guide slot 9f moves outwardly with respect to the center line $l_0$. As shown in FIG. 11C, when the first engaging hole 33b has reached the dead line $l_1$, the stress F by the toggle spring 25 is directed toward the guide arm shaft 22 along the dead line $l_1$. On this account, the moment applied so far to the guide arm 21 clockwise about the guide arm shaft 22 is reduced to zero, and consequently, the CD 11 can easily be set at a predetermined position thereafter.

When the toggle spring 25 is turned about its end engaged with the engaging slot 9f of the base plate 9 so that the other end engaged with the first engaging hole 33b moves outwardly of the dead line $l_1$, a moment acts counterclockwise and the CD 11 can be inserted more easily. The CD 11 is thus held at the predetermined position with the outer peripheral surface of its lowest portion resting on the inner peripheral surface of the disc support 9b. The guide arm 21 turns slightly counterclockwise by the above-mentioned moment and the guide boss 23b in the guide slot 9f abuts against its outer end farther from the center line $l_0$, limiting further rotational movement of the guide arm 21. In this state the inner peripheral surface of the large-sized disc support portion 30a is held slightly apart from the outer peripheral surface of the CD 11 (FIG. 11D).

(c) In the case of unloading the 12 cm diameter CD:

When the CD 11 is lifted up along the CD holding disc 4, the outer peripheral surface of the CD 11 abouts against the inner peripheral surface of the upper portion of the bottom panel 30 of the guide arm 21 as shown in FIG. 12A. Further lifting up the CD 11 against the moment applied to the guide arm 21, the guide arm 21 turns clockwise and the guide boss 23b in the guide slot 9f moves from its outer end toward its inner one as shown in FIG. 12B. When the end of the toggle spring 25 engaged with the first engaging hole 33b has reached the dead line $l_1$, the moment acting on the guide arm 21 becomes zero, allowing more ease in pulling up the CD 11.

When further pulling up the CD 11, the upper portion of the guide arm 21 is opened outwardly, and when the end of the toggle spring 25 engaged with the first engaging hole 33b is brought to the inside of the dead line $l_1$, a moment acts on the guide arm 21 clockwise, and consequently, the pulling-up of the CD 11 becomes increasingly easier. When the guide boss 23b in the guide slot 9f moves to its inner end as shown in FIG. 12C, the disc detect arm 23 turns counterclockwise under action of the coiled spring 26, in consequence of which the guide boss 23b in the guide slot 9f moves up to its upper end and is locked there. At the same time, the projection 23a enters into the window 30c of the large-sized disc support portion 30a. Also in this state the guide arm 21 is locked and does not turn in either direction. However, a moment is always applied to the guide arm 21 clockwise.

Although in the above the present invention has been described to be applied to the loading of 12 cm and 8 cm diameter CDs, the invention is not limited specifically thereto but may also be applied to mechanisms for loading two discs of different diameters such as video discs and records other than the CDs.

While in the above the dead line $l_1$ has been described to be a straight line joining the rotary shaft 22 of the guide arm and the hole 9e engaged with one end of the toggle spring 25, this is the case in which the two legs of the toggle spring 25 are of the same length. When the legs are of different lengths, the dead line $l_1$ does not necessarily agree with the above-said straight line. It is also possible to employ an arrangement in which the rotary shaft 24 of the disc detect arm 23 is disposed closer to the guide arm shaft 22 than the projection 23a and the coiled spring 26 is disposed in such a manner as to apply a moment to the disc detect arm 23 clockwise. In such a case, the perpendicular slot of the guide slot 9f is formed so that it extends in the direction opposite from the guide arm shaft 22. Moreover, it is evident that the arc-shaped slot of the guide slot 9f may also be approximated by a straight slot.

It will be apparent that many modifications and variations may be effected without departing from the scope of the novel concepts of the present invention.

What is claimed is:

1. A rotary disc loading mechanism comprising:
a base plate;
right and left guide arms mounted on said base plate symmetrically with respect to its center line, for guiding and holding the peripheral margin of a disc in cooperation with each other, each of said right and left guide arms having a small-diametered disc holding portion for holding a small-diametered disc and a large-diametered disc holding portion for holding a large-diametered disc, and said each guide arm being rotatable in a plane parallel to said base plate between a first rotational angular position for holding said small-diametered disc and a second rotational angular position for holding said large-diametered disc;
lock means provided corresponding to said right and left guide arms, respectively, for normally locking the corresponding guide arm at said first rotational angular position; and
disc detect means provided corresponding to said right and left guide arms, respectively, for detecting loading of said large-diametered disc on said large-diametered disc holding portion of said corresponding guide arm and unlocking said corresponding guide arm from said first rotational angular position to permit its rotational movement.

2. The rotary disc loading mechanism of claim 1, wherein said disc detect means each include a disc detect arm having a projection for contact with the peripheral margin of said loaded large-diametered disc and rotatably mounted on said corresponding guide arm, and a bias spring for biasing and turning said disc detect arm to project said projection into said large-diametered disc holding portion.

3. The rotary disc loading mechanism of claim 2, wherein said lock means each include an L-shaped guide slot made in said base plate and an engaging protrusion provided on the corresponding disc detect arm said slidably engaged with said L-shaped guide slot.

4. The rotary disc loading mechanism of claim 1, further including bistable bias means provided corresponding to said right and left guide arms, respectively, whereby when the corresponding guide arm is biased in either one of two directions across a point substantially intermediate between said first and second rotational angular position, a moment is applied to said corresponding guide arm in that direction.

5. The rotary disc loading mechanism of claim 1, wherein each of said right and left guide arms is a substantially arcuate member which has at one side of its center of rotation said small-diametered disc holding portion and said large-diametered disc holding portion and at the other side of said center of rotation an extension, the distance between free ends of said extensions of said guide arms is smaller than the diameter of said large-diametered disc in its loaded state so that when said large-diametered disc is unloaded, it presses said extensions outwardly, returning each of said guide arms of said first rotational angular position.

6. A rotary disc loading mechanism comprising:
a base plate;
right and left guide arms rotatably mounted on said base plate in a plane parallel thereto and symmetrically with respect to its center line, for guiding and holding the peripheral margin of a disc in cooperation with each other, each of said right and left guide arms having a small-diametered disc holding portion for holding a small-diametered disc and a large-diametered disc holding portion for holding a large-diametered disc;
a disc detect arm rotatably mounted on each of said right and left guide arms in a plane parallel to said base plate, said disc detect arm having a guide boss for controlling the rotational movement of said each guide arm and a projection for contact with the marginal edge of said large-diametered disc in said large-diametered disc holding portion;

a bias spring connected between each of said right and left guide arm and said guide arm corresponding thereto, for biasing said projection of said disc detect arm toward said large-diametered disc holding portion at all times; and a toggle spring connected between each of said right and left guide arms and said base plate, for applying to said each guide arm a moment which reverses its direction when said each guide arm passes its predetermined rotational angular position relative to said base plate;

wherein said base plate has a substantially L-shaped guide slot composed of a slot substantially extending along an arc coaxial with a rotary shaft of said each guide arm and a lock slot extending from one end of said arc-shaped slot almost at right angles thereto; said guide boss of said each disc detect arm is slidingly guide in said guide slot; and said projection of said each disc detect arm lies outside or inside said large-diametered disc holding portion of said each guide arm depending on whether said guide boss of said each disc detect arm stays in said arc-shaped slot or said lock slot of said guide slot.

7. The rotary disc loading mechanism of claim 1, wherein said guide arms are made of synthetic resin.

8. The rotary disc loading mechanism of claim 1, wherein said base plate has a large-diametered disc support provided across said center line.

9. The rotary disc loading mechanism of claim 1, wherein said predetermined rotational angular position where said moment reverses its direction is set on a straight line joining the center of rotation of said each guide arm and a position where the corresponding toggle spring is engaged with said base plate.

10. The rotary disc loading mechanism of claim 1, wherein said lock slot of said guide slot extends toward the rotary shaft of said guide arm corresponding thereto.

11. The rotary disc loading mechanism of claim 1, wherein each of said right and left guide arms has extensions extending in opposite directions with respect to its rotary shaft and the distance between the tips of said extensions is smaller than the diameter of said large diametered disc when said disc is held at a predetermined position.

12. The rotary disc loading mechanism of claim 1, wherein said disc detect arms, said bias springs, said toggle springs and said guide holes associated with said right and left guide arms, respectively, are arranged substantially symmetrically with respect to said center line of said base plate.

* * * * *